Dec. 15, 1959          N. ANTON          2,917,632
RADIATION DETECTOR AND INDICATOR
Filed May 4, 1953          10 Sheets-Sheet 1
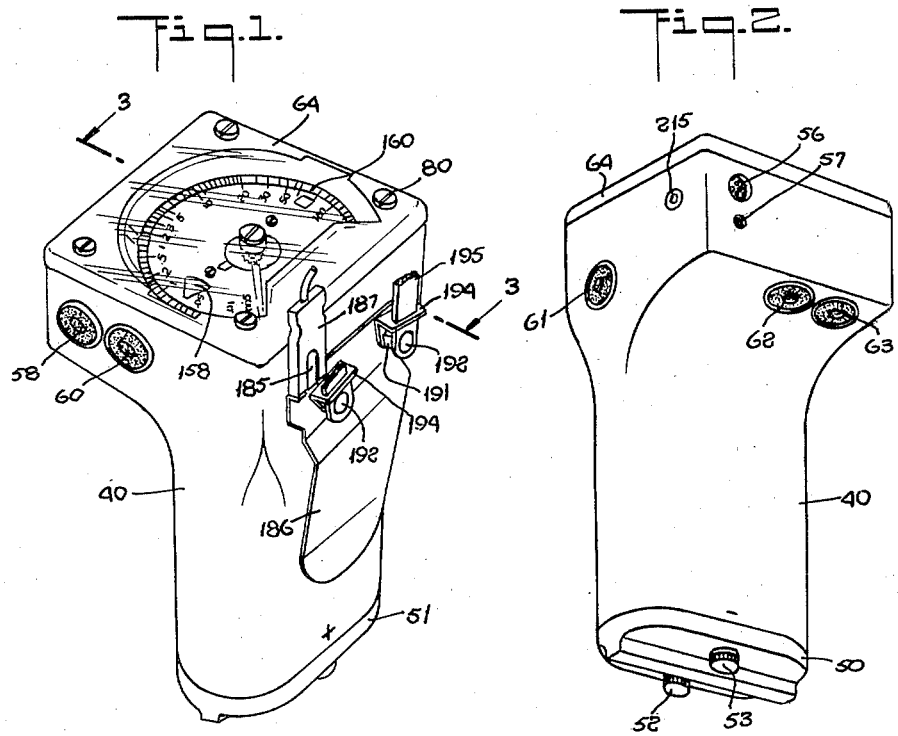
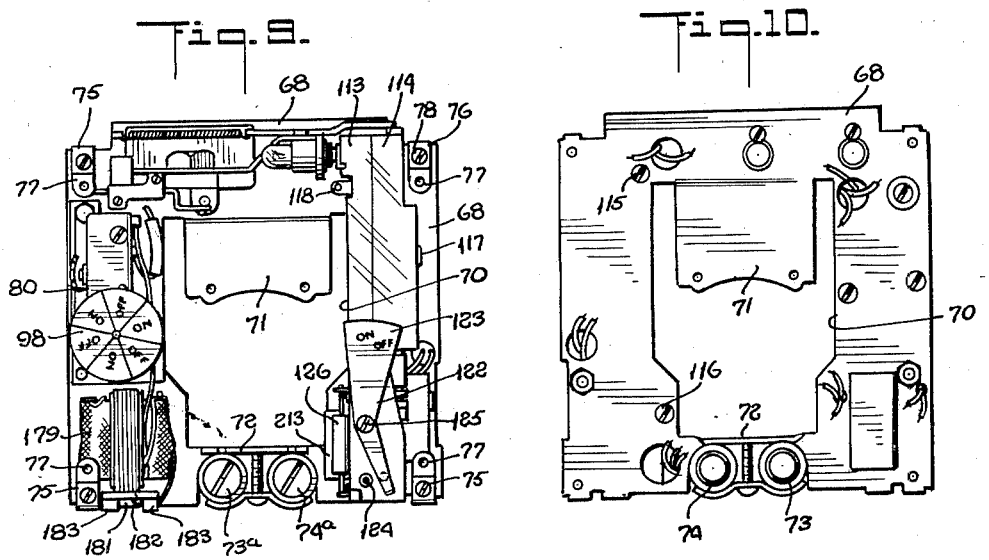
INVENTOR
NICHOLAS ANTON
BY Darby & Darby
ATTORNEYS

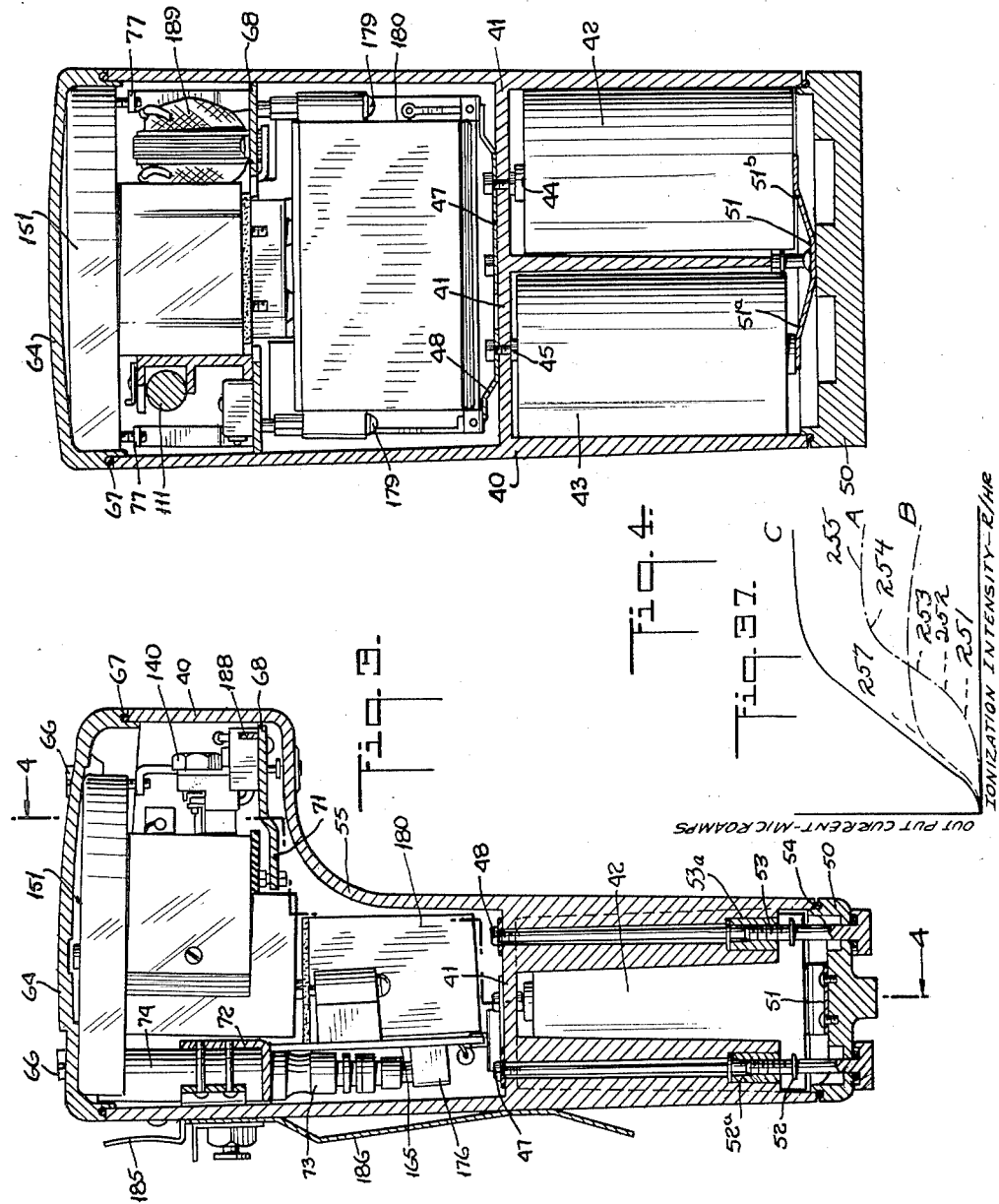

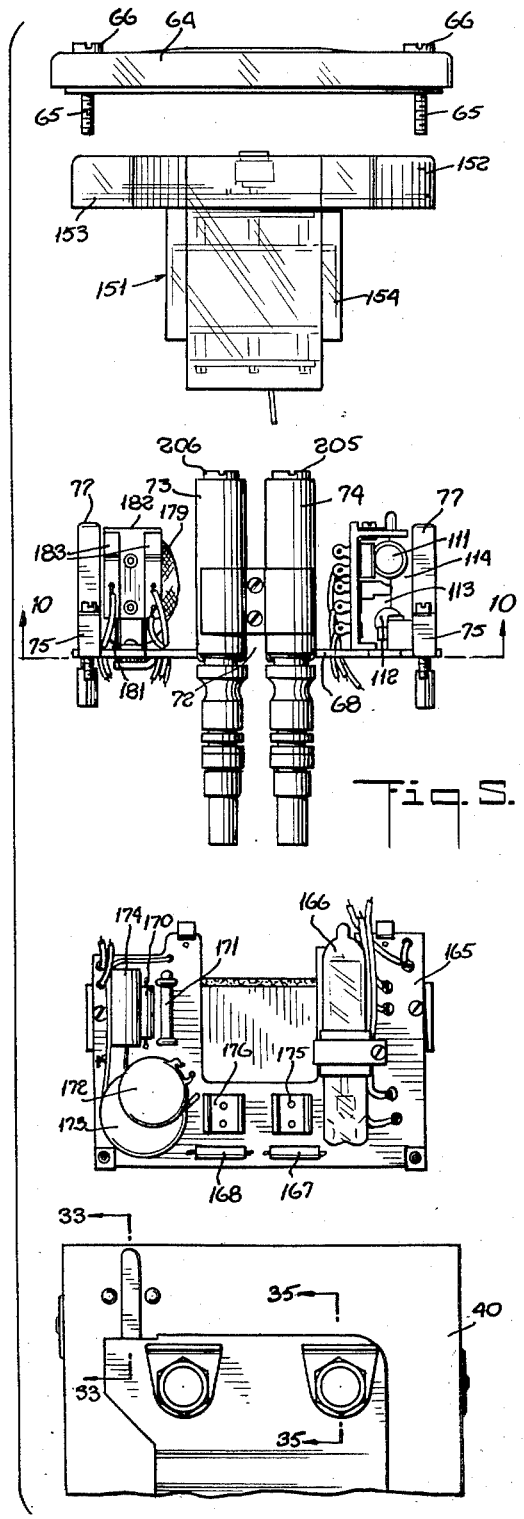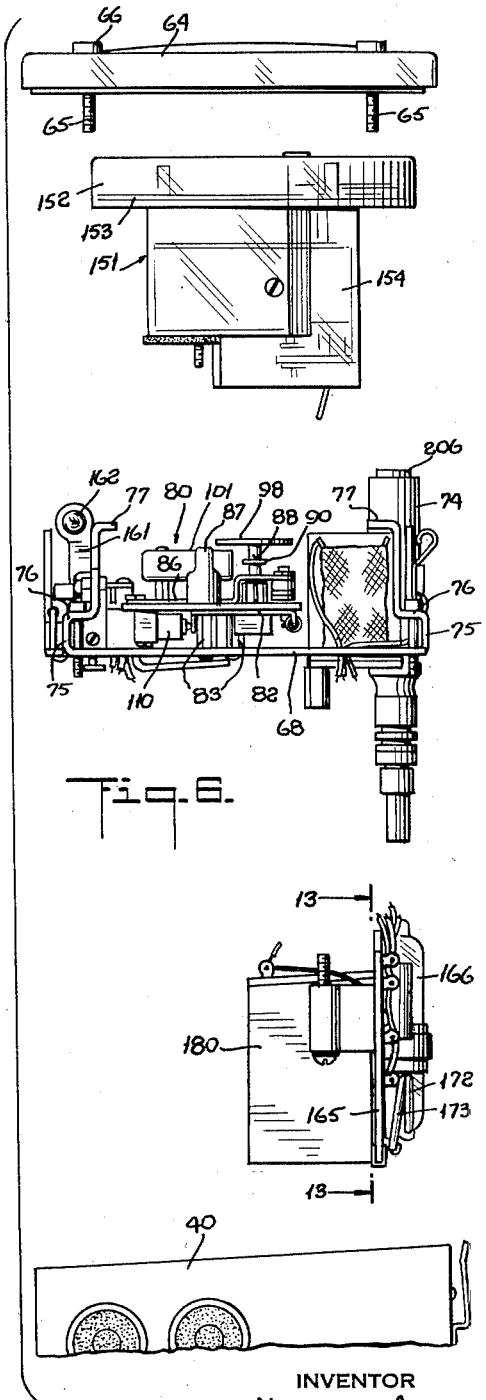
INVENTOR
NICHOLAS ANTON
BY Darby & Darby
ATTORNEYS

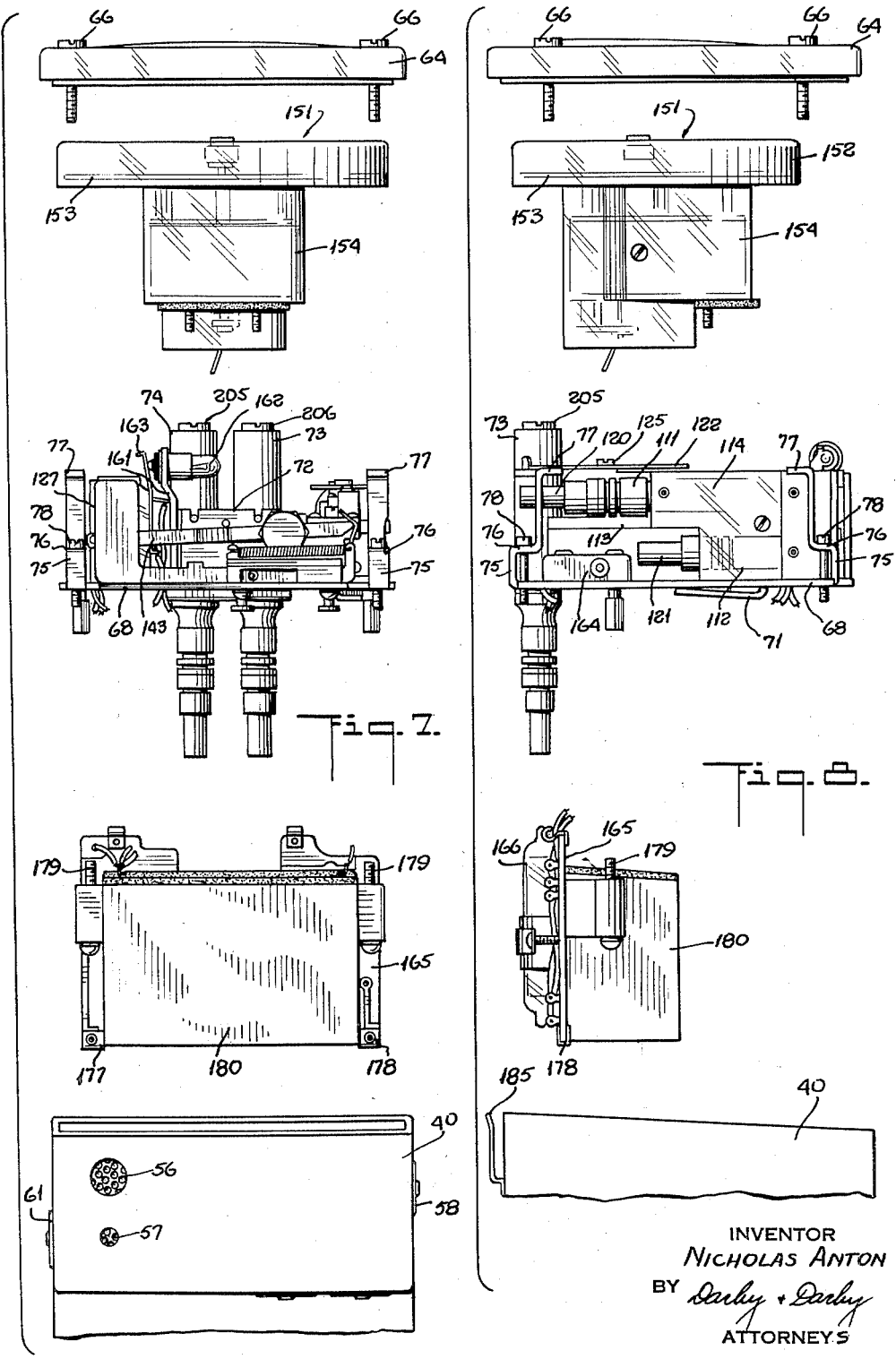

Dec. 15, 1959 N. ANTON 2,917,632
RADIATION DETECTOR AND INDICATOR
Filed May 4, 1953 10 Sheets-Sheet 5
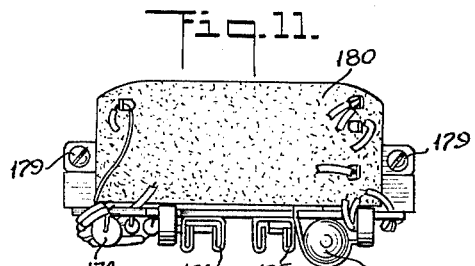
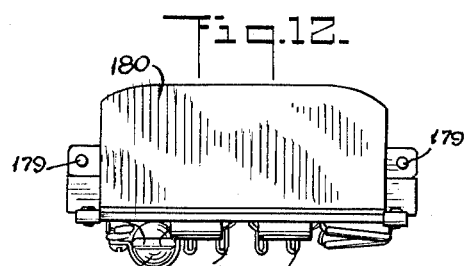
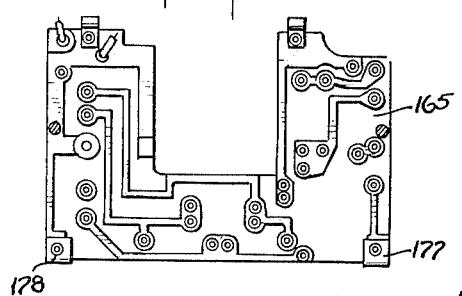
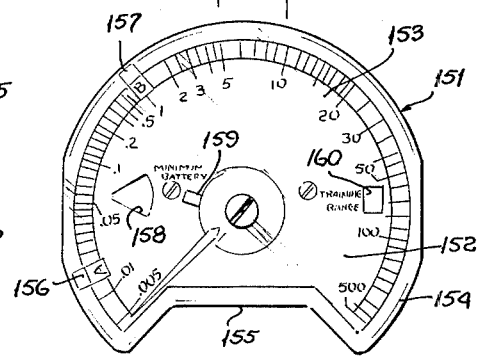
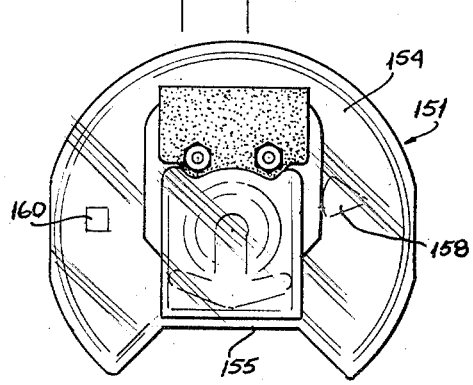
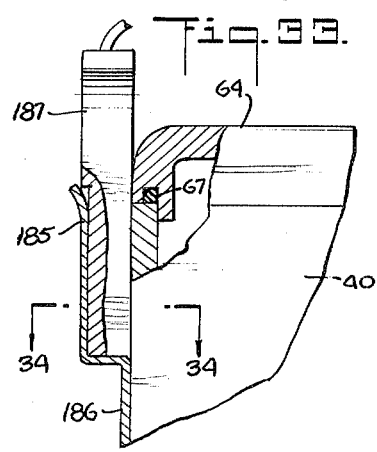
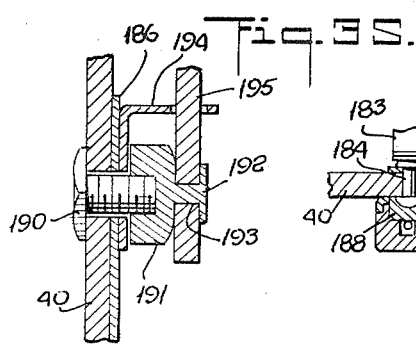
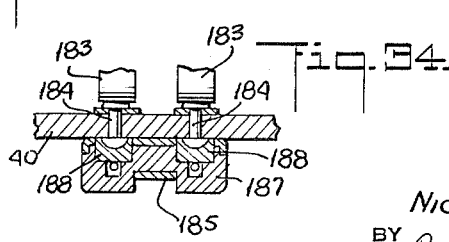
INVENTOR
NICHOLAS ANTON
BY
ATTORNEYS

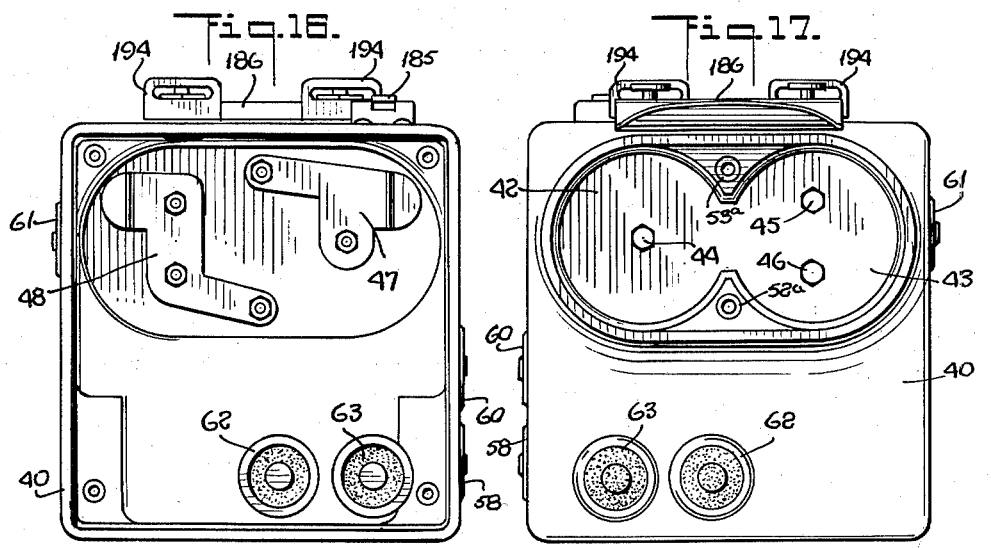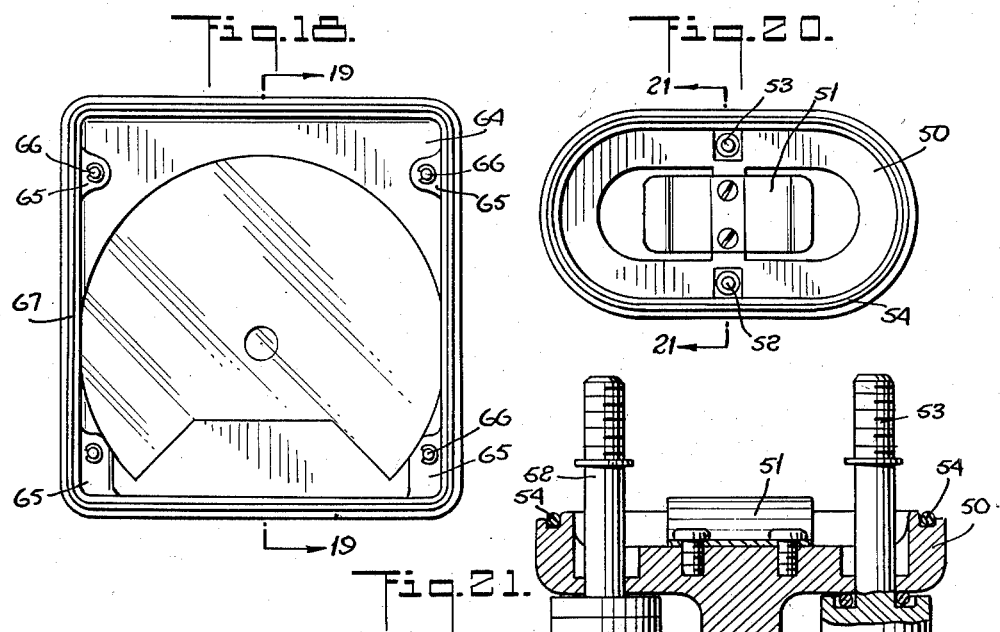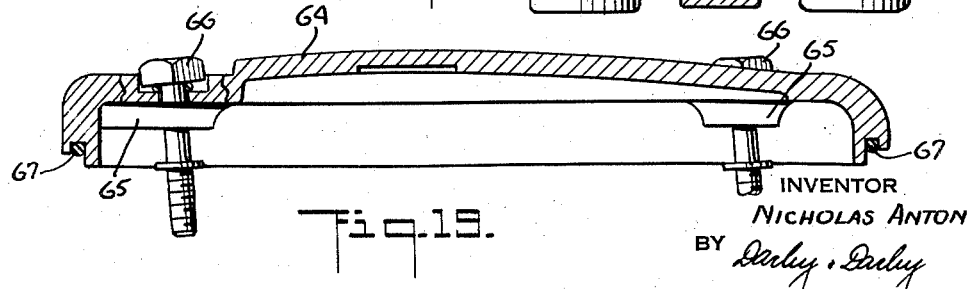

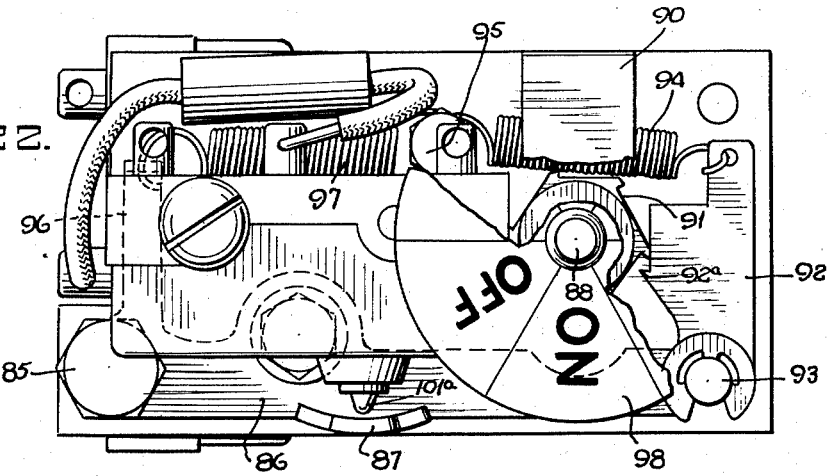

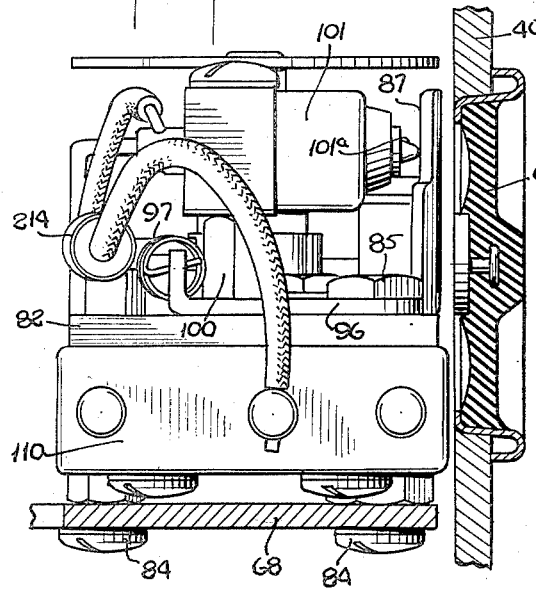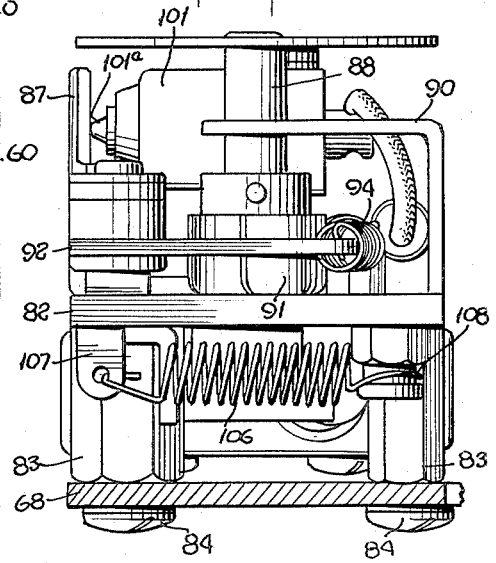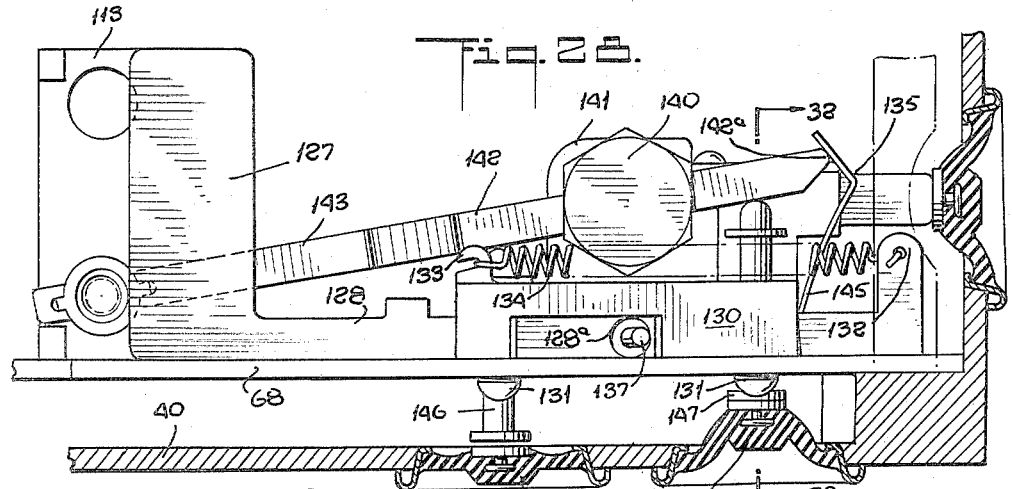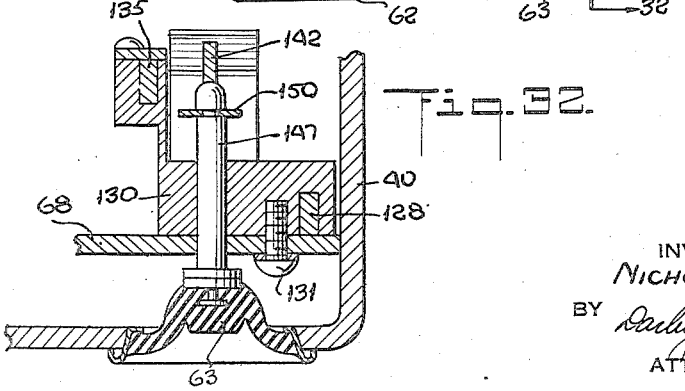
INVENTOR
NICHOLAS ANTON
BY Darby & Darby
ATTORNEYS

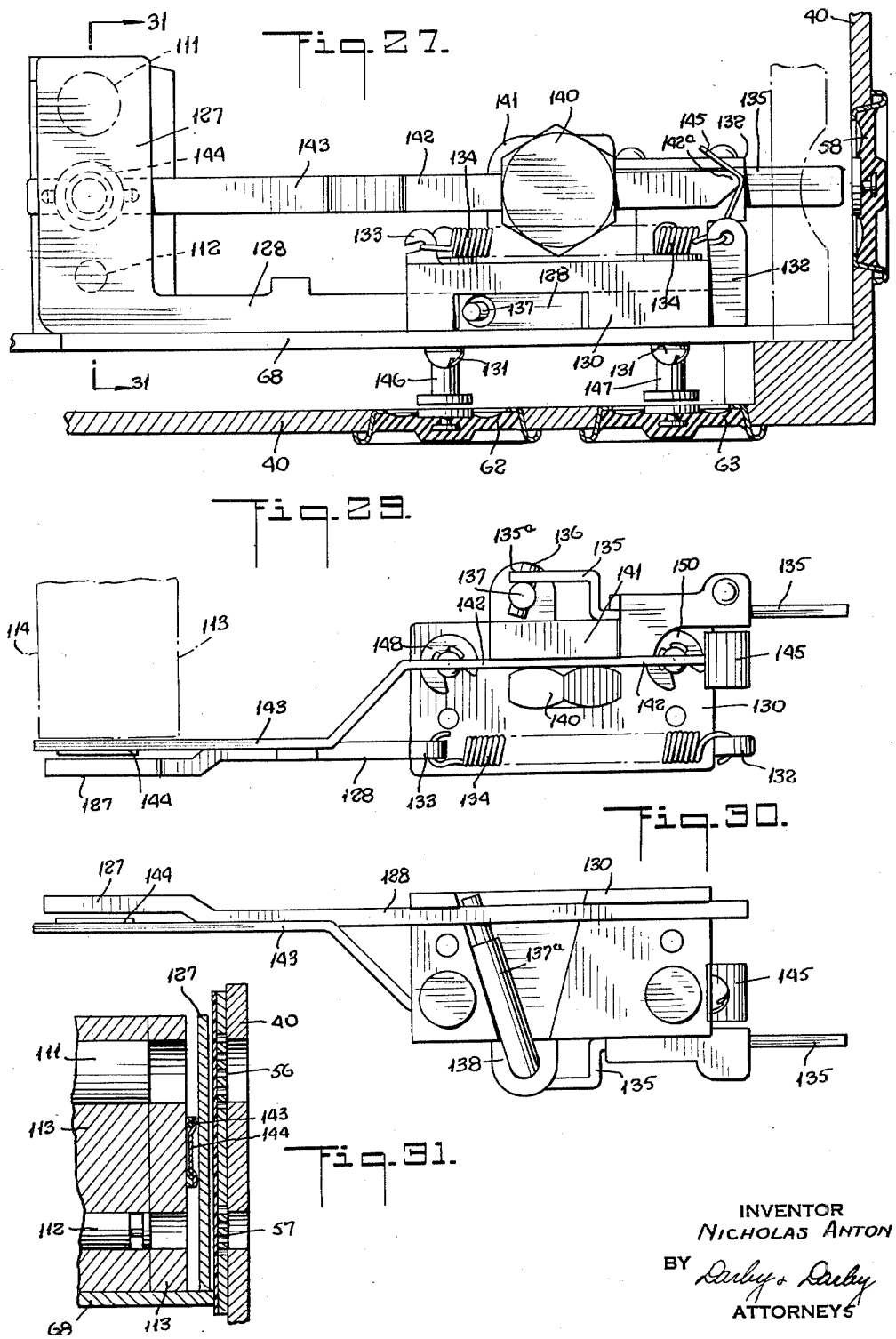

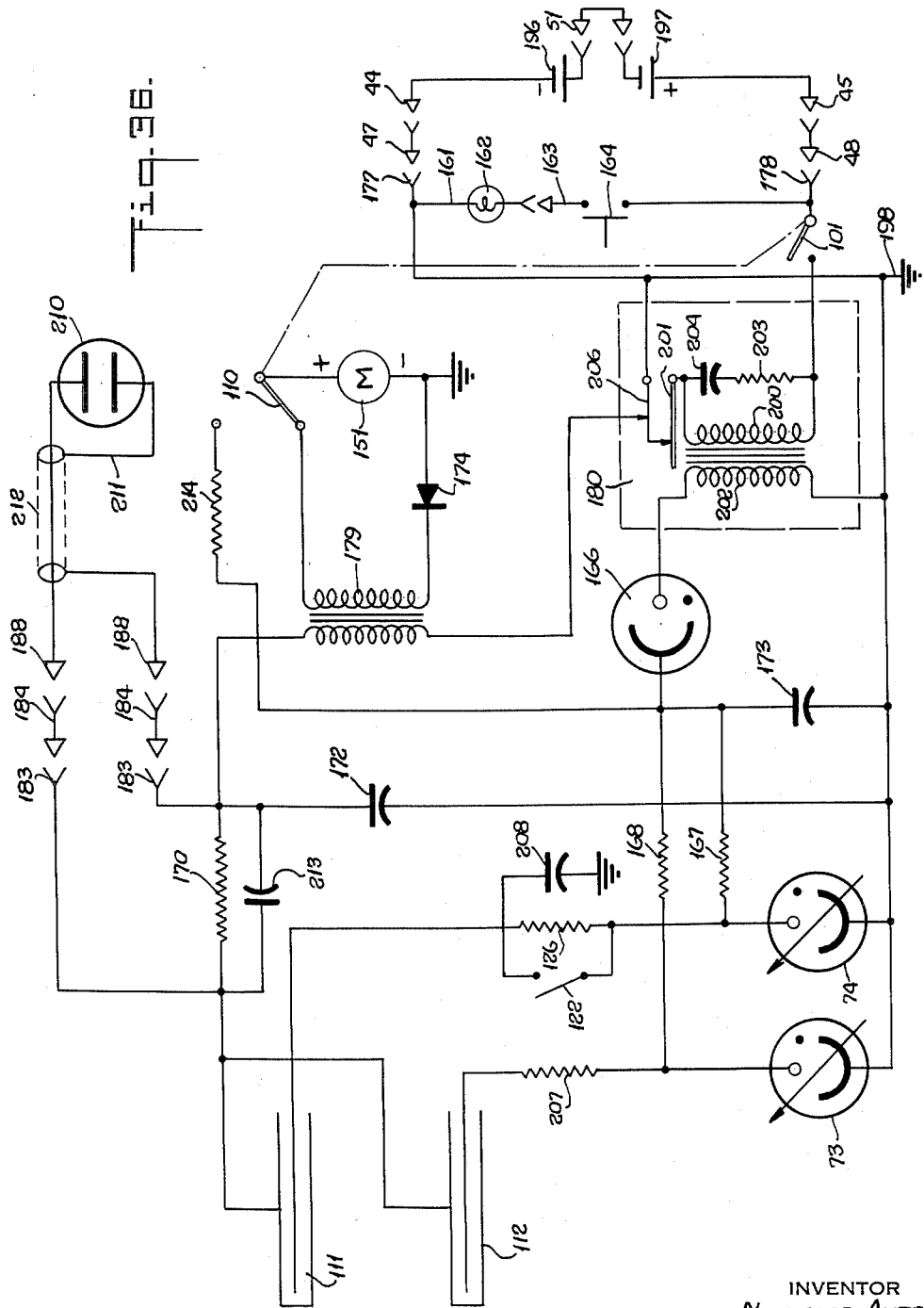

United States Patent Office 2,917,632
Patented Dec. 15, 1959

2,917,632

RADIATION DETECTOR AND INDICATOR

Nicholas Anton, Brooklyn, N.Y.

Application May 4, 1953, Serial No. 352,802

35 Claims. (Cl. 250—83.6)

The present invention relates to the detection of gamma and beta radiation such as that emanating from radioactive substances or from cosmic rays or other sources, and particularly to such an instrument which gives both a visual and aural indication of radiation and of the quantity thereof.

The instrument is designed to indicate gamma radiation alone and to also indicate the presence of beta radiation in the presence of gamma radiation.

The instrument is provided with a built-in radioactive source which is utilized for checking the instrument prior to use.

The instrument of the present invention is so designed as to be extremely compact and to include a power source in a single housing with the Geiger integrator tubes and the various circuit elements necessary to its operation. The case is watertight, and the instrument is of small size and portable.

It is an object of the invention to provide a detector of both gamma and combined gamma and beta radiation.

It is an object of the invention to provide such an instrument which is adapted to give both visible and audible indication of the presence of radiation.

It is a still further object of the invention to provide such an instrument wherein integrator tubes are utilized for detecting radiation, such integrator tubes being supplied with operating power from dry cells, the device containing no thermionic tubes and consequently requiring no period of filament heating before it is in condition for operation.

It is another object of the invention to provide an instrument of the type described having all components thereof, including the dry cells which are the power source, housed in a small, light, waterproof casing, which casing is provided with means for carrying including both a shoulder strap and a belt clip.

It is a further object of the invention to provide conveniently located controls external of the instrument which do not require any openings in the instrument and which thus assure that the watertight characteristics are maintained during use.

It is a still further object of the invention to provide an instrument of the class described in which the various component parts are readily assembled without the use of more than ordinary hand tools.

Other objects and features of the invention will be apparent when the following description is considered in connection with the annexed drawings, in which:

Figure 1 is a perspective view of the instrument of the invention, the view being taken from the front left hand corner looking down upon the instrument;

Figure 2 is a perspective view of the instrument of the invention, the view being taken from the rear looking upward;

Figure 3 is a vertical cross-sectional view of the instrument of the invention, the view being taken on the line 3—3 of Figure 1;

Figure 4 is a vertical cross-sectional view of the instrument, the view being taken on the plane of the line 4—4 of Figure 3;

Figure 5 is an exploded front elevational view of the instrument of the invention;

Figure 6 is an exploded elevational view, the view being taken from the left hand side of the instrument as seen in Figure 1;

Figure 7 is a view similar to Figure 5, being taken, however, from the rear instead of from the front;

Figure 8 is an exploded elevational view taken from the right hand side of the instrument as seen in Figure 1;

Figure 9 is a top plan view of the instrument with the housing cover removed and with the meter also removed;

Figure 10 is a horizontal cross-sectional view showing the lower side of the chassis plate, and taken on the plane of the line 10—10 of Figure 5;

Figure 11 is a top plan view of the vibrator and chassis unit of the instrument;

Figure 12 is a bottom plan view of the unit of Figure 11;

Figure 13 is a fragmentary vertical cross-sectional view of the instrument taken on the plane of the line 13—13 of Figure 6 showing particularly the printed circuit;

Figure 14 is a top plan view of the meter proper, showing particularly the graduations appearing on the dial and the windows through which certain signals may be observed;

Figure 15 is a bottom plan view of the meter of Figure 14;

Figure 16 is a top plan view of the housing of the unit with the cover and contained apparatus removed, this view showing particularly the contacts through which power is fed to the electrical circuits;

Figure 17 is a bottom plan view of the casing showing particularly the arrangement of the contact members in the lower compartment in which dry cell batteries are normally housed;

Figure 18 is a bottom or inner side plan view of the cover for the main compartment;

Figure 19 is a vertical cross-sectional view of the cover of Figure 18, the view being taken on the plane of the line 19—19 of Figure 18;

Figure 20 is a plan view of the cover for the lower or battery compartment, the view being taken from the inner side of the cover;

Figure 21 is a transverse cross-sectional view of the battery compartment cover of Figure 20, taken on the plane of the line 21—21 of Figure 20;

Figure 22 is an enlarged top plan view of a sub-assembly comprising a switch for completing the power circuit to the unit, an indicator for indicating when the power is on or off, and a second switch which is closeable to indicate the available voltage and whether that voltage is within required limits;

Figure 23 is a side elevation of the sub-assembly of Figure 22;

Figure 24 is a bottom plan view of the sub-assembly of Figure 22;

Figure 25 is a rear elevational view of the sub-assembly of Figure 22;

Figure 26 is a front elevational view of the sub-assembly of Figure 22;

Figure 27 is a rear elevational view of a further sub-assembly utilized to operate a beta ray shutter and to move a calibartion checking source of radioactive material into alignment with an entrance window in either one of two integrator tubes;

Figure 28 is a view similar to Figure 27 but showing the beta shutter in its operated or beta-indicating position and also showing the calibration checking source in operative position;

Figure 29 is a top plan view of the mechanism of Figures 27 and 28;

Figure 30 is a bottom plan view of the mechanism of Figures 27 and 28;

Figure 31 is a fragmentary vertical cross-sectional view on the plane of the line 31—31 of Figure 27 showing particularly the relationship of the beta shutter and the calibration checking source holder to the integrator tubes and to the window provided in the casing in alignment with the windows in the integrator tubes;

Figure 32 (adjacent Figure 28) is a fragmentary vertical cross-sectional view taken on the plane of the line 32—32 of Figure 28 and showing how the external operating button cooperates with the mechanism of Figure 28 to operate the lever carrying the calibration checking source;

Figure 33 (adjacent Figure 14) is a fragmentary cross-sectional view of the instrument case, the view being taken on the plane of the line 33—33 of Figure 5, and showing particularly the manner in which an earphone plug may be clipped to the case to extend certain circuits from components within the case to an earphone;

Figure 34 is a horizontal fragmentary cross-sectional view taken on the plane of the line 34—34 of Figure 33 and showing in detail the mode in which the earphone plug is constructed and makes contact with the various circuits through brushes mounted on other components;

Figure 35 is a fragmentary cross-sectional view of the instrument case showing the manner in which a carrying strap is mounted on the case, and taken on the plane of the line 35—35 of Figure 5;

Figure 36 is a schematic circuit diagram of the radiation detector of my invention; and Figure 37 is a graph of certain integrator tube characteristics.

As has been indicated by the figure descriptions, the radiation detecting instrument of the invention is composed of a number of units which are assembled together and mounted in a common housing. These units include a meter; voltage regulating tubes; a chassis unit on which certain Geiger integrator tubes, a battery on-off switch and indicator, a minimum-battery switch, a beta shutter operator, and a calibration checking source operating lever are mounted; a sub-chassis including a printed circuit, various resistors, capacitors, a transformer and a vibrator; and a source of direct current power, specifically a pair of dry cells.

In describing the instrument the various elements will be separately described followed by a description of the electrical interconnection of the various elements and operation of the device both for field use and training purposes.

Housing

The instrument housing 40 is in the shape shown in Figures 1, 2 and 3, being generally L-shaped in vertical cross-section. This housing 40 is preferably made of molded plastic or other insulating material and is divided at about its center into two completely isolated compartments by a wall 41 extending across the housing in the manner shown particularly in Figures 3 and 4. The lower compartment thus formed comprises two generally cylindrical communicating cavities 42 and 43 as indicated in Figure 17, these cavities being adapted to contain dry cell batteries which supply power to the instrument. It will be noted that wall 41 is supplied with a single contact button 44 at the center of cavity 42 thereof and with two contact buttons 45 and 46 which are located within but off center as respects cavity 43. Contacts 44, 45 and 46 extend through the wall 41 as is clearly shown in Figure 4. Fixed to the contact 44 on the upper side of the wall 41 is a spring terminal member 47, also shown in Figure 16, and fixed to both the contacts 45 and 46 on the upper side of the wall 41 is a spring terminal member 48.

The lower or battery compartment just described is provided with a cover 50 (Figures 2, 3, 4, 20, 21) which has fixed thereto an electrically conductive spring member 51. As shown most clearly in Figure 4, spring member 51 is secured to cover 50 at the center, and has two contact portions 51a and 51b bowed upwardly from the center. The member 51 is adapted to contact the centrally located button terminal at one end of a dry cell or the base terminal at the opposite end of another dry cell. Since the single button 44 is adapted to make contact with the central contact button of a dry cell and the buttons 45 and 46 are adapted to make contact with the base of a dry cell, it will be seen that the arrangement just described assures that dry cells be placed in the compartment in such a manner that they are connected in series and with the proper polarity and the total added voltage of the two cells appears across the terminal springs 47 and 48.

Referring now to Figures 3, 4, 20 and 21, the battery compartment cover 50 is held in position by means of the two screws 52 and 53. These screws thread into inserts 52a and 53a molded into the walls of the battery compartment, these inserts extending upwardly through the walls and connecting one to the terminal 47 and the other to the terminal member 48 (see Figure 3). Thus the screws 52 and 53, in addition to serving as elements to tighten the cover against the lower edge of the battery compartment, may also serve to conduct current from an external source to the instrument when this is desired, in which case the batteries are of course omitted. In such case, the heads of screws 52 and 53 may act as binding posts for wires connected to such external source.

It will be noticed that the cover 50 is provided with a gasket member 54 which is preferably of rubber and which forms a watertight and vaportight seal for the battery compartment. It should also be noted that where the contacts 44, 45, 46 extend through the wall portion 41 they are molded therein so that the battery compartment is entirely separated from the upper compartment of the casing. In this way, should the batteries require changing, this may be done without admitting water or vapor into the upper compartment.

The upper housing compartment 55 serves to house all of the remaining components of the instrument. This compartment has provided therein, and specifically in the rear wall thereof as shown in Figure 2, two windows 56 and 57 which windows, as will later appear, are in alignment with the windows of two integrator tubes and admit gamma radiation, and, when desired, also beta radiation to the tubes when a shutter is displaced out of alignment with the windows as will be hereinafter described.

Mounted in the walls of the housing compartment 55 are five flexibly mounted button members designated 58, 60, 61, 62 and 63 (Figures 1 and 2). The construction and mounting of these buttons is illustrated in Figures 27, 28 and 32. Each button is mounted in a flexible, extensible diaphragm, such as of rubber or the like, which is molded to the button at its center, and sealed to the housing wall at its perimeter. Each button has a hard or metallic face juxtaposed against the mechanism element to be actuated thereby. These button members are so located that they cooperate with operating portions of the instrument and thus make possible the control thereof while maintaining a completely watertight and vaportight condition. The buttons 58, 60, 61, 62, 63 respectively control the beta shutter, the power source, a dial light switch for the meter, an operating position for the calibration checking source lever, and a second operating position for the calibration checking source lever.

The upper housing compartment 55 is provided with a cover 64 which is made of a molded plastic or similar material and is in part transparent, this cover being shown in elevation in Figure 18 and in cross-section in Figure 19. As will be seen particularly by reference to these figures, the cover is provided with strengthened portions 65, and screws 66 extend through these portions, these screws being utilized to hold the cover tightly against the upper edge of the housing 40, the cover being provided with a rubber gasket 67 to assure that the watertight and vaportight condition of the instrument may be maintained.

*Main chassis*

The various components of the main chassis are mounted on a chassis plate 68 (see Figures 5 to 10) which plate is generally square having a cutout central portion indicated at 70 at the rear of which is a tab member 71 bent off from the main chassis plate so as to lie slightly below and parallel with the plate 68. Also bent off the main chassis plate at the front thereof and forming a notch therein is a portion 72 which extends upwardly at right angles to the plate 68, this bent portion 72 serving, as will hereinafter appear, to mechanically support a pair of voltage regulator tubes 73 and 74. Extending upwardly from each corner of the plate 68 is a member 75 (see Figures 7 and 8), these members having horizontally extending portions 76 and 77 at different levels. The members 75 form mounting means for fastening the chassis plate 68 in position in the housing portion 55 and in addition form means for retaining the cover member 64 in position on the housing 40. Screws 78 pass through the lower offset portions 76 of the members 75 and serve to hold the chassis plate 68 within the housing portion 55, while the screws 66 pass through the cover member 64 and into threaded openings in the upper offset portions 77 of the members 75.

The various units or sub-assemblies supported on the chassis plate 68 will now be described.

*Power switching unit*

Mounted centrally of the left hand side of the chassis plate 68, as seen in Figures 6 and 9, is a unit 80 which, for convenience, will be denominated the power switching unit. This unit comprises a mounting plate 82 (see Figures 6 and 22 through 26) fixed to the plate 68 by means of the spacer sleeves 83 and cooperating screws 84. Pivotally mounted on a screw 85 is a lever 86 which extends to the right as seen particularly in Figures 22 and 23 and is bent upwardly and then again horizontally at its right hand end. Lever 86 also has an upwardly extending portion 87 built integrally therewith. Extending vertically adjacent the right hand end of the lever 86 is a shaft 88 which is rotatably supported adjacent its lower end in the plate 82 and intermediate its ends in a bracket member 90 which is in turn fixed to the rear edge of the plate 82. Mounted on the shaft 88 just above plate 82 is a ratchet wheel 91 and cooperating with the ratchet wheel is a ratchet pawl 92 mounted on the right hand end of the lever 86 through the medium of pivot 93. The pawl tooth 92a of pawl 92 is held in contact with the ratchet wheel 91 by means of a spring 94 which extends from the rearward end of pawl 92 to a stud 95 mounted on the plate 82.

Extending rearwardly from the arm 86 is an extension 96 thereof which extension is urged to the right in Figure 22 by a spring 97 extending between the rear end of the extension 96 and the stud 95. Fixed to the shaft 88 and rotating therewith is a dial 98 having alternate sectors colored red and green and marked "on" and "off" respectively. Mounted above the plate 82 and spaced therefrom by means of the sleeves 100 is a microswitch 101, the operating button 101a of which extends forwardly in alignment with the upper portion of the extension 87 of lever 86. This extension 87 is so located that it may be operated by means of the operating button 60 in the housing 40 (see Figure 25).

Pivotally mounted on the forward one of the studs or sleeves 83 which space the plate 82 above the chassis plate 68 and lying against the lower side of plate 82 is a bell crank lever 102 having a downwardly bent portion 103 near the right hand end thereof (as seen in Figure 23) and having another downwardly bent portion 104 (see particularly Figure 24) near the rearward end thereof. Shaft 88 extends through the plate 82 and has fixed thereto beneath the plate 82 a cam 105 which cooperates with the extension 103 mentioned just above. Lever 102 is held with the extension 103 flat against the cam 105 by means of a tension spring 106 extending between a lug 107 on lever 102 and a screw 108 threaded into the plate 82.

Mounted on the underside of the plate 82 is a second microswitch 110 the operating button 110a of which extends to the right as seen in Figures 23 and 24 and is in position to be actuated by the extension 104 of the lever 102. Cam 105 is substantially hexagonal in form, the alternate flat surfaces being at different radii. When cam 105 presents a smaller radius flat to extension 103, spring 106 rotates lever 102 about pivot 83 so that extension 103 abuts the cam flat, whereupon extension 104 actuates microswitch button 110a to close the switch 110 to make its circuit. When cam 105 is rotated one-sixth revolution to present a larger radius flat to extension 103, lever 102 is rotated away from switch button 110a and the circuit is broken. Thus, rotation of the shaft 88 causes the microswitch 110 to alternately complete a circuit therethrough and to break that circuit.

As will be clear from the above description, depression of the operating button 60 acts against extension 87 of lever 86 to cause pawl 92 to step ratchet 91 (and hence shaft 88 and cam 105) one-sixth of a revolution. This will cause the microswitch 110 to be operated with the result that current from the dry cells in the battery compartment is supplied to the vibrator and other equipment for producing relatively high constant voltage to operate the instrument, as described more in detail below.

It will be noted that the extension 87 of lever 86 causes operation of microswitch 101 only while the button 60 is maintained pressed inwardly against the resistance of spring 97, whereas the simultaneous operation of microswitch 110 causes it to be operated to a new position which it retains until the button 60 has been again pressed. Microswitch 110 is effective, as stated, to switch the battery on and off and the indicator 98 shows the switch position. The microswitch 101 is connected in a circuit so that the power output is fed to the meter, as will be hereinafter described, in order that a check may be made to determine whether the minimum voltage necessary is being supplied by the power source.

*Integrator tube unit*

As has been indicated the detection of radiation is effected through the use of two integrator tubes, two tubes being utilized in the manner described below in order that a wider range may be covered. Preferably these tubes are of the type 212 and 213 integrator tubes made by Anton Electronic Laboratories, Inc. The two integrator tubes designated 111 and 112 respectively (see Figures 5, 8, 9 and 31) are fixed between two insulating, preferably transparent plastic, holding members 113 and 114, each tube-holding member being provided with a pair of semicylindrical longitudinally extending cavities therein and the two tube-holding members cooperating to clamp the integrator tubes 111 and 112 between them. The tube-holding member 113 is fastened to the main chassis plate 68 by means of the screws 115 and 116 (see Figure 10) and the tube-holding member 114 is clamped to tube-holding member 113 by means of a screw 117 (Figure 9). The two integrator tubes 111 and 112 are thus held in a fixed position on the plate 68, this position being such that mica windows in the ends of the two tubes are in alignment with the windows 56 and 57 in the housing 40.

The semicylindrical cavities in tube-holding members 113 and 114 just above-mentioned surround an electrically conducting split sleeve, preferably of tantalum, and these sleeves in the cavities of tube-holding member 113 are connected together and connected through the insulating material to a common terminal 118. In this manner the cathodes of the two integrator tubes are connected together and, as will be described later, connected in the electrical circuit.

As will be seen particularly in Figure 8, the outer tube-holding member 114 is of lesser longitudinal extent than the inner tube-holding member 113. The tube-holding member 113 is provided with two spring clips, not shown in the drawings, which underlie the metallic end terminals 120 and 121 respectively of the integrator tubes 111 and 112, and form anode leads to the tubes.

Another feature of the present invention resides in the special integrator tubes used, and in their special combination to produce special results.

The integrator tubes 111 and 112 are preferably of the Anton type 212 and 213, having similar construction and supplementary characteristics, as set forth hereinbelow. These tubes incorporate the energy independence feature described and claimed in application Serial No. 96,711 of Nicholas Anton, filed June 2, 1949, to produce energy independence over the range of substantially from 0.08 million electron volts to 2.0 million electron volts. The actual tube cathodes are made of chrome iron, and cooperate with the tantalum sleeves to create energy independence. In the case of the 212 tube, .014 inch of tantalum is used with .047 inch of chrome iron. For the 213 tube, .007 inch of tantalum is used with .010 inch of chrome iron. In each case the proportions of these materials is proper in relation to the tube filling to provide the desired characteristic.

As a further feature, these integrator tubes 111 and 112 are provided with beta-particle permeable windows at one end, adjacent the casing apertures so that, when beta shutter 127 is shifted aside, the instrument records both gamma and beta radiation, while with shutter 127 in place, only gamma radiation is indicated, thereby yielding a simple mode of determining individually the gamma and beta radiation.

Another feature of the invention resides in the special combination of integrator tube characteristics which permit obtaining the extremely extended range of readings from .01r to 500r/hr. with a single instrument.

Integrator tubes of the present type, using concentric electrodes and a halide gas, have the same general characteristics, which can be varied from tube to tube by varying the diameters of electrodes and the pressure of gas. The general shape of such characteristics is shown in Figure 37, by curve A, for example, wherein the abscissa represents ionization intensity in roentgens per hour and the ordinate represents current output in microamperes. Such characteristic is characterized by an initial portion 251 of slight slope, followed by a lower bend or "knee" 252 leading into a steeper sloped portion 253, followed by an upper bend or knee 254 which leads into a plateau portion 255. When an extended range is desired, requiring that the plateau be at a high level, a necessary concomitant has been that the tube will be extremely insensitive at the lower portion 251. Conversely, if an attempt is made to increase sensitivity at the left end, the end result is decreased response at the right end.

According to the present invention this defect is removed by a special combination of two tubes, in which the lower knee 252 of one is located substantially at the same radiation intensity as that of the upper knee 257 of the other. The combined added effect of these two curves A and B is then as shown at C, where sensitivity at the lower end is retained without impairing response at the upper end. In this way, the extremely broad range of 50,000 to 1, between .01 and 500r/hr. is satisfactorily attained. The circuit for this arrangement is described below.

*Training range switch*

Certain circuit elements, namely, resistors and capacitors (whose circuit is described below) are mounted on the rear surface of the tube-holding member 113 and a training range switch is mounted on the upper surface of the tube-holding member 113 and arranged to short out a resistor 126 so as to provide for a "training range" setting of the power supply to the integrator tube 111, as will hereinafter appear when the circuit is discussed. The training range switch comprises a pivoted metallic lever 122, one end of which carries an indicator 123 (see Fig. 9), and the other end of which, in one position, makes contact with a contact member 124 mounted on the member 113 and in the opposite position is free of such electrical contact. A screw 125 on which the lever 122 is pivoted is connected to the opposite end of resistor 126 from the contact 124 and therefore when the forward end of the lever 122 is in the position shown in Figure 9 the training range switch is open and the circuit is in normal position for field operation, the resistor 126 then being included in the circuit. When the switch is operated to the other position, that is, when the switch arm 122 is operated to the left, it makes contact with 124 and shorts out the resistor 126, setting the device for operation in the training range. The indicator 123 is positioned beneath the meter and the "off" or "on" designations on the indicator 123 are visible through a window 160 in the meter dial as will be described hereinafter.

*Beta shutter and checking source operating mechanism*

As has been indicated hereinabove, a mechanism is provided for interposing a metallic shutter between the windows of the Geiger integrator tubes 111 and 112 and the corresponding windows 56 and 57 in the casing 40, for the purpose of blocking off beta rays. Also a mechanism is provided for placing a button of radioactive material acting as a calibration source before either the window in the upper integrator tube 111 or the window in the lower integrator tube 112, or in position between these windows where it will not affect either. The mechanisms just above-mentioned are best shown in Figures 27 through 31.

Referring to the figures mentioned, there is shown at 127 the beta shutter which shutter is formed integrally with a slide 128 mounted in a slot in the under surface of a block 130 fixed to the main chassis plate 68 by means of the screws 131. At the right hand end of slide 128 there is formed an upward extension 132 between which and an ear 133 at the left hand edge of the block 130 a tension spring 134 is stretched, the spring 134 thus serving to hold the shutter 127 in its normal left hand position in front of the windows of the integrator tubes 111 and 112.

Slidably mounted in a second slot provided in the upper surface of the block 130 is a second slide bar 135 the right end of which (as seen in Figure 27) lies just inside the wall of the housing member 40 and in position to cooperate with the button 58. At its left hand end, as seen in Figure 29, this slide bar 135 is offset at 135a and has a hole therein into which extends a pin 136. Pin 136 is fixed in a shaft 137 which is supported in a bushing 138 (Figure 30) formed as an integral part of the block 130. The shaft 137 has a right-angled bend with a horizontal portion 137a beneath the bushing 138 and extending into a hole 128a formed in the slide 128. Thus when the button 58 is operated, the slide bar 135 is moved to the left, rotating the shaft 137 in a counterclockwise direction as seen in Figure 29 (clockwise direction as seen in Figure 30). This movement of shaft 137 results in the movement of the beta shutter 127 to the right and permits direct ingress of beta rays through the housing windows 56 and 57 and through the end windows in the integrator tubes 111 and 112 to the interior of those tubes.

Pivotally mounted on a screw 140 which is threaded into an upward extension 141 of the block 130, is a lever 142 which has an offset portion 143 at the left hand end thereof, as is clearly shown in Figures 27 through 30. A button 144 of radioactive material, such as barium carbonate made with radioactive carbon (C14), is fixed on the left hand end of lever 143. The lever 143 normally lies in the position indicated in Figure 27 with the button 144 between the end windows of the tubes 111 and 112.

The right hand end 142a of lever 142 is pointed and cooperates with a centering spring 145 of the bent leaf type to retain lever 142 in the central position shown in Figure 27 and to return it to that position after movement therefrom, the spring 145 being fixed by any suitable means as, for example screws, to the right hand end of the block 130. Two headed rods 146 and 147 extend upwardly through bores in the block 130, the upper ends of these rods being provided with C-washers 148 and 150 respectively which retain the rods and prevent them from dropping out from their respective bores. The upper ends of the rods 146 and 147 lie immediately beneath the operating lever 142 at either side of the pivot screw 140. Thus elevation of the rod 146 will move the radioactive button 144 upwardly as seen in Figure 27 and into alignment with the window of the tube 111, while operation of the rod 147 will cause downward movement of the button 144 into position in front of the window of the tube 112 (see Figure 28). Upon release of rods 146 or 147, spring 145 returns lever 142 and button 144 to central position. The rods 146 and 147 are respectively in alignment with the flexible buttons 62 and 63 in the casing 40 and are therefore operated by those buttons as desired.

*Meter*

The meter used in this instrument is a direct-current moving coil voltmeter, which is encased in a vapor-tight transparent plastic case as is indicated particularly in Figures 14 and 15, in which the meter is generally designated by the reference numeral 151. The transparent plastic case 154 is removable and conforms to the shape of the dial 153 (Figures 5 and 14). This dial is calibrated in terms of radiation, such as in roentgens per hour, the calibrations extending from zero through 500. The dial 153 as well as the meter case 154 and the transparent member cover 152 are cut out as indicated at 155 to accommodate the upper ends of voltage regulator tubes 73 and 74 (Figures 5 to 9). Each voltage regulator tube 73, 74 is adjustable by means of a screw (73a or 74a respectively) at its upper end which is exposed when the housing cover member 64 is removed from the instrument. These tubes are preferably of Anton type 404.

Slidable tabs 156 and 157 (Figure 14) are mounted on the upwardly extending rim of the meter casing 154 and are held in place by the meter cover 152. These tabs are respectively marked A and B and are positioned under test conditions to indicate the proper readings when checking operation by use of the checking source 144.

The dial 153 is provided with two windows 158 and 160. As has been indicated before, the on-off switch indicator or dial 98 lies beneath the window 158 and one of its "off" or "on" sectors is visible therethrough, and in a like manner the training range indicator 123 lies beneath the window 160 and its "off" or "on" signal is visible therethrough. Dial 153 is also provided with a line 159 indicating a requisite minimum battery output, as described below.

*Dial lamp*

Mounted in an aperture at the upper end of a bracket 161 (see Figures 6 and 7) is a small lamp 162, the lamp being positioned just above the plane of the dial 153 so that the light therefrom illuminates that dial. Bracket 161 is fixed by any suitable means as, for example, screws, to the chassis plate 68.

Pivotally mounted on the insulating block 113 adjacent the bracket 161 is a spring contact member 163 (Figure 7) which serves not only to extend an electrical circuit to the lamp 162, but also as a spring member to hold the lamp in position with the flange on the rear of the lamp against the edges of the aperture in the bracket 161.

Mounted on the right hand forward corner of the chassis plate 68, as seen particularly in Figure 8, is a microswitch 164, the operating button of which extends outwardly into position to cooperate with the button 61 in the housing 40. As will later appear, the bracket 161 is connected to one terminal of the dry cells, the opposite terminal of the dry cells being connected to the switch 164 and through that switch to the center terminal of the lamp, so that the switch 164 controls the flow of current through the lamp under the actuation of button 61.

*Sub-chassis*

A sub-chassis is provided which comprises a fibre plate 165 (Figures 5-8) on one side of which various circuit components including the rectifier tube 166, the resistors 167, 168, 170, the capacitors 171, 172 and 173, the germanium crystal rectifier 174 and the voltage regulator tube clips 175 and 176 are mounted.

On the opposite side of the fibre plate 165 is a printed circuit shown particularly in Figure 13. This printed circuit comprises two portions 177 and 178 which extend around the lower edge of the plate 165 and make contact, when the unit is in position in the housing 40, with the spring terminals 47 and 48 respectively. In this way the batteries are connected to the printed circuits of fibre plate 165 and thence to the various circuit components mounted on the opposite side of that plate 165 as well as to the various units previously described and mounted on the main chassis plate 68. These connections will become obvious when the circuits are described below.

*Vibrator*

Fixed to the main chassis plate 68, as by screws 179, is an encased vibrator unit which converts the three volt D.C. power supply to a D.C. supply of the order of 800 volts. This vibrator unit is shown particularly in Figures 11 and 12 and is there designated 180. The vibrator 180 supports the sub-chassis 165 in contact with terminals 47, 48 as described above. The vibrator unit 180 and transformer 189 are described more in detail below with respect to the circuit.

*The meter transformer*

The meter transformer 189 just above-mentioned is mounted on the main chassis plate 68 at the left-hand forward corner thereof and is best seen in Figures 4 and 9. The primary of this transformer, as will later appear, is connected in the output of the integrator tubes 111 and 112 and the secondary thereof is connected in series with the moving coil of the meter 161.

*Earphone and connections therefor*

Mounted at the forward left-hand corner of the main chassis plate 68 is a bracket 181 on which is fixed a fibre plate 182 to which in turn are fastened two contact springs 183 (see Figures 9, 33 and 34). These contact springs are so positioned that when the instrument is placed in its housing they make contact with suitably positioned rivets 184 extending through the housing 40 (Figure 34). Mounted on the outside of the housing 40 adjacent the rivets 184 is an upwardly extending spring clip 185, this clip being formed as a part of a belt clip and carrying strap member 186 (Figure 3) which is secured to housing 40 by a bolt 190 and nut 191.

A capacitance type earphone is supplied with the instrument, this earphone being connected by means of a cable to a plug 187 having a slot in one wall thereof for accepting the spring clip member 185 thereby holding the plug 187 in position against the housing 40. Plug 187 is provided with two terminal members 188 which, when the plug 187 is in the position indicated, make contact with the heads of rivets 184 thereby extending the circuit from spring members 183 to the earphone.

Carrying strap

As has been indicated above, a belt clip 186 is provided which is a wide resilient metal member fixed to the housing 40 and extending downwardly and pressing against the housing at its lower end so that a belt or like member may be resiliently held between the clip 186 and the housing. This clip 186 is fixed to the housing by means of two bolts 190 and cooperating nuts 191 (see Figures 1 and 35). The nuts 191 are especially designed and have a headed end 192 adjacent an annular groove 193 therein. Between the belt clip 186 and each nut 191 an L-shaped member 194 is pivotally mounted, these L-shaped members having slots in their outwardly extending ends (Figures 1 and 35).

A carrying strap 195, preferably of plastic material is provided, with a hole at each end thereof which holes may be enlarged by stretching the material so that the head 192 of a nut 191 may be inserted through the opening. The strap is led through the slot in the end of the corresponding L-member 194 before being placed in the groove 193 of the nut 191, so that it is virtually impossible to accidentally remove the strap from its position in the groove 193, thus assuring that the instrument will not be inadvertently dropped while being carried by the strap. In order to prevent accident arising by virtue of the detection instrument being caught in a position which is dangerous for the operator thereof, the strap 195 is carefully designed to break or tear at a predetermined tension.

Electrical circuits

The foregoing has described the mechanical organization of the various component parts of the radiation detecting meter and indicator of the invention. Referring now to Figure 36, a description of the electrical connections of the various parts and their functioning will be given. In Figure 36 the parts are shown schematically, but are designated by the same reference characters which have been employed in describing the physical appearance and location of these parts.

Before proceeding with the details of the circuit it may be well to explain briefly the purpose of the instrument and the general principles of its operation.

Due to the recent use and importance of atomic energy, it is often necessary that radioactive materials be handled, detected and measured, since many chemical elements such, for example as radium, as well as fission products like cobalt 60, have the property of radiating invisible radiant energy in the form of gamma or beta rays which can penetrate the human body and, if of sufficient intensity or duration, can cause serious injury and death. The instrument of this invention is designed to detect radioactivity and measure radiation field intensity in order to protect personnel from exposure to damaging concentrations of radioactivity.

As is well known, the three most important types of radiation are called alpha, beta and gamma rays. All of these different forms of radiation are capable of producing ionization and it is this property which is utilized to detect their presence. In detecting radiation the Geiger-Müller tube is generally used. This tube consists of a cylindrical metal cathode concentrically arranged about a fine wire anode, the electrodes being suspended in a sealed envelope which contains a mixture of gases ordinarily at a pressure less than atmospheric. A potential slightly below the ionization potential of the gas mixture is applied to the tube and, as long as there are no ionizing particles present in the gas, no current flows in the tube. However, when the tube is placed in a radiation field ionizing particles will enter the tube. Gamma radiation impinges upon the metal cathode and electrons are knocked loose from the metal into the gas. Beta particles, which are high speed electrons, enter the tube through the beta window. In either case, the electrons collide with gas molecules in their path and ionize those molecules. The ions and electrons thus produced are attracted toward the electrodes and gain enough kinetic energy to ionize other gas molecules by collision. These secondary ions are also accelerated by the electric field and in turn collide with still other gas molecules to produce still further ionization. To prevent the Geiger-Müller tube from going in a state of continuous discharge after the initial ionization event has occurred, certain gases and vapors are added to the gas mixture to serve as quenching agents.

The output of the Geiger-Müller tube thus consists of a series of pulses having a rate of occurrence that is related to the rate of intercepted ionizing events and is therefore essentially a counting tube to be used in a circuit that counts the number of ionizing event occurring within the tube.

In the device of the present invention the tubes used are not Geiger-Müller tubes but are integrator tubes. These tubes are similar in construction to the conventional Geiger-Müller tube save that the processing of the cathode and anode during manufacture is quite different and enables the electrodes to withstand the higher current necessary in a type of circuit which is entirely different from that employed with Geiger-Müller tubes. In this circuit the integrator tube produces an average current proportional to the radiation field intensity, which current is of a sufficient magnitude to be read directly by a rugged sensitive portable meter. The integrator tube is thus required to deliver a high charge per pulse and to be able to withstand a high internal ion intensity. It is for this reason that the electrodes are specially processed and can thus withstand the bombardment they receive as a result of the high ion densities.

With this general description in mind the schematic circuit diagram of Figure 36 can be readily followed.

A pair of dry cells 196 and 197 mounted in the battery compartment of the instrument, as previously described, and connected in series by means of the spring clip 51, supply a voltage which appears on the terminals 44 and 45—46, the voltage being approximately 3 volts. Due to the construction previously described, this voltage also appears across the spring terminals 47 and 48 in contact with the respective sub-chassis terminals 177 and 178. The dial lamp 162 is connected by means of the bracket 161, the spring contact member 163 and the switch 164 across terminals 177 and 178, and may thus be operated at any time by operating switch 164 by actuating button 61.

Terminal 177 is shown as being connected to ground at 198, this showing being merely conventional and indicating that the negative side of the battery is connected to a common return.

The positive terminal 178 is connected by means of the on-off switch 101 to the primary winding 200 of the vibrator unit 180. The other side of the winding 200 is connected through vibrator contacts 201 to ground.

Thus the 3 volt D.C. supply is applied to the input of the vibrator-transformer 180 which is constructed to interrupt its own primary current and develops an open circuit voltage of approximately 1600 volts A.C. across its secondary 202. A resistor 203 and capacitor 204 are connected in series across the contacts 201 of vibrator 180 to suppress arcing and consequent pitting of the contacts.

Half-wave rectification of the secondary voltage of the vibrator 180 is provided by the rectifier tube 166 which is a cold cathode gas-filled diode. The rectified voltage is filtered by means of a capacitor 173 to provide a minimum of 830 volts D.C. across the filter capacitor 173 which voltage is then supplied to two regulating circuits.

A separate variable regulated high voltage is required to supply each of the two integrator tubes 111 and 112. The regulating circuit for integrator tube 111 consists of a resistor 167 in series with corona discharge type voltage regulating tube 74. Tube 74 functions in a manner similar to the standard gaseous discharge voltage regulator tube except that it is adjustable over a minimum range, such as from 604 to 705 volts. This variation is made possible by the incorporation of a bellows-like section in the tube envelope which can be manipulated to vary the gas pressure within the tube by varying its volume. The volume variation mentioned is accomplished by means of an adjustment screw 205 located at the upper end of the tube (see Figures 7 through 10).

The regulating circuit for integrator tube 112 comprises a resistor 168 and in series with tube 73, which is identical with and functions in the same manner as the regulating tube 74 and its circuit. These regulating circuits produce regulated voltages across tubes 73, 74.

The two integrator tubes 111 and 112 are utilized as radiation detectors. Tube 111 is the more sensitive of the two and serves primarily to detect radiation dosages ranging from background level to 5 roentgens per hour. Tube 112 serves primarily to detect radiation dosages ranging from 5 roentgens per hour to 500 roentgens per hour.

As has been hereinabove indicated ionizing events cause current to be conducted through one or both of the integrator tubes. Current is drawn by tube 111 through the anode series resistor 126 while current is drawn by tube 112 through anode series resistor 207. Both currents add together at the cathodes of the integrator tubes and pass through resistor 170 connected across the earphone terminals 183 (see Figure 5). The earphone 210 (preferably of the capacitance type) is thus connected across resistor 170 and is responsive to the current through the resistor. This current is the summation of many separate pulses, and especially for low levels, its varying or alternating component is indicative of radiation dosage, in regions where radiation levels may be too low to supply a readable indication on meter 151. Capacitor 213 is coupled across resistor 170 and has a capacitance larger than that of earphone 210 to avoid any substantial variation in circuit constants when the earphone 210 is plugged in or removed from the circuit.

The meter circuit is designed to respond to the direct current component of the combined integrator tube outputs, which is indicative of radiation dosage. For this purpose the A.C. component of the combined tube output is by-passed by capacitor 172, and the remaining D.C. component is supplied to the primary of transformer 179.

According to one feature of the present invention, the meter circuit is provided with increased sensitivity, permitting direct use of a moving coil meter 151 without amplification. This is accomplished by the present circuit, in which the meter transformer 179 primary winding is connected to ground through contact 206 of vibrator 180. As vibrator 180 operates, contact 206 grounds and ungrounds the meter transformer primary, and "chops" the D.C. input signal. This permits the meter transformer to step-up the input signal to high enough levels for direct indication. The meter 151 is connected across the transformer 179 secondary through rectifier 174, preferably of the dry type such as a germanium crystal, which converts the stepped-up A.C. signal into D.C. to actuate the meter 151, which gives a visual indication of the radiation dosage.

By closing the training range switch comprising the parts 122 through 125 (see Figure 9) the anode series resistor 126 is shorted out in order to produce full scale meter deflection at a radiation intensity of approximately 1 roentgen per hour, this being effected by causing a higher current to flow in integrator tube 111 at low radiation intensities. This permits use of the instrument at low levels which are not harmful to the user, thereby permitting the user to obtain actual operational experience with the present instrument, and serving as a training aid.

As was indicated hereinabove an earphone is provided, designated 210 in Figure 36. This earphone is connected to the plug 187 (see Figure 34) by means of a coaxial cable comprising the two conductors 211 and 212. Conductors 211 and 212 are connected across the earphone load resistor 170 when the plug 187 is held in position by the clip 185, the circuit being extended through the terminals 188, rivets 184 and spring contacts 183.

A battery voltage test circuit is also provided and consists of the current limiting resistor 214 (see Figures 25 and 36) and the battery voltage switch 110. The purpose of this switch is to permit checking the power supply performance in the field. Operation of the "on-off" push button 60 actuates the single-pole, double-throw, spring-return, microswitch 110 in addition to actuating the "on-off" microswitch 101. The ungrounded terminal of indicating meter 151 is then connected through resistor 214 to the cathode of rectifier tube 166 thereby giving a meter indication of the output voltage of the rectifier. In this way, it can be determined whether the batteries may have deteriorated with age or use so as to be below the minimum effectiveness necessary for proper operation. It will be understood that so long as the battery voltage is sufficiently high, the regulator tubes will maintain a uniform output as needed for accurate indications, and the battery check circuits permits determination of this.

In use, each time the button 60 is held depressed, as when turning the instrument on, the battery condition is indicated, thereby showing at each use whether the instrument is accurate. Release of the button 60 then re-connects the meter to the secondary of transformer 179 to yield radiation dosage readings as hereinabove described.

*Operation*

The normal operation procedure which has been indicated in the foregoing comprises a number of steps which are set forth in detail below.

(1) The instrument is first tested by the following steps:

(a) The "on-off" button 60 is pressed to the "on" position and the meter reading checked while the button is held depressed. The meter reading at this time should be no less than is indicated by the minimum battery marking 159 on the meter dial 153. The button 60 is then released and at this time the meter reading should fall to zero (in the absence of radiation being detected).

(b) The right hand calibration check button 62 is now actuated, resulting in the exposure of the low intensity integrator tube 111 to the internal radioactive test button 144, this exposure resulting through operation of the lever 142 in the manner previously described. The meter reading at this time should be approximately that of the test point B as indicated by the adjustable tab 157.

(c) The left hand calibration check button 63 is now depressed in order to check the high intensity integrator tube 112. This exposes the high intensity tube 112 to the internal radioactive test button 144 due to the operation of the lever 142 in the opposite direction from that in which it moved in the preceding step. At this time the meter reading should be approximately that of the adjustable tab B on the meter dial 153.

(d) If the head set or earphone 210 is to be utilized, the operation thereof is checked by listening for clicks when the calibration check button 62 or 63 is depressed.

(2)

(a) If aural as well as visual indications are desired, the earphone plug 187 is positioned against the side of the case in the manner already specified, and held in its position by means of spring clip 185, and of course the earphone is positioned adjacent the operator's ear.

(b) While approaching the radioactive object or area clicks are listened for in the head set 210 or the meter reading is observed or both.

(c) If it is desired to locate a radioactive object or the center of a radioactive area, the instrument is moved in the direction that produces an increase in the meter reading or in the number of clicks heard, and movement in this direction is continued until the maximum meter reading is found, which will of course indicate the point of maximum radiation intensity.

(d) If the radiation from an object is extremely weak, then the instrument should be brought to within a few inches of the object in order to obtain an indication, the head set 210 being utilized for very weak radiation, as in checking for contamination.

(e) If it is desired to check the combined beta and gamma radiation of an object the beta shutter push button 58 is operated and the meter indication noted, after which the button 58 is released and the new meter indication noted. Any difference between the two readings indicates the presence and extent of beta radiation.

(3) The desired indications having been procured, button 60 should again be depressed to turn off the batteries.

*Calibration*

The adjustable tabs 156 and 157 on the meter dial 153 are provided so that the adjustment of the voltage regulator tubes 73 and 74 and the operating conditions of other circuit components such as the rectifier tube 166 may be checked and set. Any replacement of either the integrator tubes 111 and 112 or the regulator tubes 73 and 74 or of the rectifier tube 166 will normally require a resetting of the tabs 156 and 157 and a proper adjustment of the voltage regulator tubes to give a correct reading of the meter. For this purpose, with a known calibrated radioactive source, the regulator tubes are adjusted to proper setting. Then the calibration buttons 62 and 63 are utilized in the manner described above in connection with the operation, and the tabs 156 and 157 are set to the readings of the meter thus determined. The setting of these tabs 156 and 157 will be modified upon replacement of any of the components just above-mentioned, and therefore it is necessary to reset the tabs in accordance with the new adjustment of the components. This may be done by utilizing the calibration center marked on the instrument casing and designated 215 in Figure 2. To effect this calibration, a cobalt 60 source having a uniform circular radiation field of at least 2 inches in diameter is procured and utilized in conjunction with a standardized "r" meter for measuring field ionization intensity. This cobalt 60 source is placed on a line extending perpendicular to the case 40 at the calibration center 215, and the distance between the case and the source adjusted to obtain a field of ionization intensity at the calibration center 215 of one roentgen per hour as measured by the "r" meter. Prior to effecting adjustment of the voltage regulator tube it is of course necessary that the cover 64 be removed from the instrument. Thereupon the screw 74a is rotated in either direction until the indication on the instrument meter 151 is 1 roentgen per hour.

The source is now moved closer to the instrument to obtain a field of ionization intensity at the bull's-eye or calibration center 215 of 300 roentgens per hour and the screw 73a of the voltage regulator tube 73 adjusted until the meter indication is 300 roentgens per hour.

Next the 0.01, 1, 10, 50 and 100 roentgens per hour points are checked in a similar manner, and if these points do not check within plus or minus 15% of the scale reading the voltage regulator tubes must be readjusted by additional adjustment of the screws 73a and 74a. It may be necessary to deviate somewhat from the primary calibration points of 1 and 300 roentgens per hour in order to cause the secondary calibration points to fall within their correct ranges as above indicated. When all of these calibration points have been properly aligned by means of the voltage regulator tube adjustments mentioned above, the meter cover is removed from the meter 151 and the tabs 156 and 157 set at the points which coincide with the meter deflection obtained by operating calibration check buttons 62 and 63.

The foregoing describes in detail the manner of construction, operation, calibration and testing of the radiation detectors and indicator of the invention.

It will be understood, however, that many modifications may be made both to the individual component mechanisms and in the general physical arrangement and circuit layout of the instrument without departing from the scope of my invention. I wish therefore to be limited not by the foregoing description which was given solely for the purpose of illustration, but on the contrary to be limited only by the claims granted to me.

What is claimed is:

1. In a radiation detecting instrument, the combination comprising two integrator tubes having similar characteristic curves expressing tube output current as a function of ionization intensity, each of said curves having upper and lower knee portions and a substantially straight portion between said knee portions, the characteristic curve of one of said tubes having its upper knee portion at substantially the same ionization intensity level as the lower knee portion of the characteristic curve of the other of said tubes, and means for providing a common output for said tubes, whereby the resultant characteristic curve for the combined tubes has an extended straight portion between the upper and lower knee portions thereof.

2. In a radiation detecting instrument, the combination of two integrator tubes having a common output, said tubes having similar characteristic curves, said curves having an upper knee and a lower knee and a substantially straight portion between said knees, said tubes being so related that the upper knee portion of the curve of one tube lies at substantially the same radiation level as the lower knee of the curve of the other, whereby the combined output curve shows an extended straight portion between the upper and lower knee portions thereof, each of said tubes being supplied with its anode voltage through an individual voltage regulator.

3. A device as claimed in claim 2, characterized in that a resistor is inserted in the circuit between each voltage regulator tube and the anode of the respective integrator tube, and further characterized in that a switch is shunted about the resistor in one of said anode supply circuits whereby the range of indication of the instrument may be altered for training purposes.

4. A device as claimed in claim 2, characterized in that a source of low voltage direct current is provided and a vibrator is connected across said source, said vibrator being in circuit with the primary of a transformer a secondary of which supplies a voltage to said voltage regulator devices, said voltage being rectified by means of a rectifier prior to application to said voltage regulator tubes.

5. A device as claimed in claim 4, characterized in that said vibrator is provided with a chopper contact and further characterized in that the output of said integrator tubes is supplied through the secondary of a meter transformer, said vibrator contacts serving to convert said output into a pulsed direct current, the secondary of said meter transformer being in series with a direct current meter and a rectifier whereby said meter indicates directly in units of radiation.

6. A device as claimed in claim 5, characterized in that switching means are provided for connecting said meter with the output of said rectifier tube whereby said meter indicates the voltage output of said rectifier tube and thus indicates whether the low voltage direct current source is of the proper voltage.

7. In a radiation detecting instrument, the combination comprising a radiation detecting tube having an anode and a cathode, a source of regulated voltage applied to said anode, a resistor in circuit between said source and said anode, an indicator coupled to said tube for indicating the radiation experienced thereby, and a switch shunting said resistor for altering the range of indication of said indicator.

8. In a radiation detecting instrument, the combination comprising a radiation detecting tube, a source of low voltage direct current, a vibrator connected to said low voltage source, a transformer having a primary winding in circuit with said vibrator and a secondary winding, a rectifier and voltage regulator in circuit with said secondary winding, the output of said regulator and rectifier being applied to said detector tube, and an indicator coupled to said tube and comprising a meter and a transformer having a primary winding coupled to said tube and a secondary winding coupled to a meter, said vibrator having a set of chopper contacts in circuit with said meter transformer primary winding.

9. In a radiation detecting instrument, the combination comprising a radiation detecting tube, a source of regulated voltage for said tube including a rectifier, and a source of low voltage direct current, a direct current meter coupled to said tube for indicating the radiation response thereof, and switching means for selectively coupling said meter to said tube or to said rectifier to determine the proper operating condition of said low voltage source.

10. In a radiation detecting instrument of the class described, and having a pair of integrator tubes each having a window therein and having a meter and circuits interconnecting said tubes and meter, means for calibrating the meter and circuit components comprising a button of radioactive material and means for positioning said button in front of the window of either of said tubes, said positioning means including a lever upon which said button of radioactive material is mounted, said lever being normally held in position such that said button lies between the windows of said two tubes.

11. A device as claimed in claim 10, characterized in that actuating means are provided for said lever to move said button into position in front of either of said two tubes, one of said actuating means being positioned on one side of the pivot point of said lever and the other on the opposite side of said pivot point.

12. A device as claimed in claim 11, characterized in that resilient means are provided for normally retaining said button in position between said two windows.

13. A device in accordance with claim 12, characterized in that said resilient means comprises a leaf spring having a return bend therein and said lever is provided with a pointed end cooperating with the return bend portion of said leaf spring.

14. A device in accordance with claim 12, characterized in that each said actuating means comprises a plunger operating against said lever, said plunger being in turn operated by a button flexibly mounted in the instrument housing.

15. A beta shutter device in a radiation detecting instrument of the class described and having a pair of integrator tubes each having a window therein for the admission of beta particles, means for controlling admission of beta rays to said two tubes simultaneously comprising a shutter impermeable to beta particles normally positioned in front of the windows of both tubes of said pair, and a manually operable means for displacing said shutter to simultaneously uncover said windows and admit beta particles to both said tubes, said manually operable means comprising a slide formed integrally with said shutter and a button for actuating said slide, said slide being resiliently held in normal position in front of said windows.

16. A device as claimed in claim 15, characterized in that said shutter is slidably mounted in a block and spring-urged to normal beta particle interrupting position and further characterized in that a second slide is arranged in said block, said second slide being actuatable by a button arranged adjacent its end, said slides being interconnected by a lever pivoted on said block.

17. In a radiation detecting instrument of the class described and having a pair of integrator tubes each having a window therein for the admission of beta particles, said tubes having their windows in the same plane, one beneath the other, means for controlling admission of beta rays to said two tubes simultaneously comprising a generally rectangular shutter covering both said windows, said shutter being impermeable to beta rays and being normally positioned in front of the windows of both of the pair of tubes, and manually operable means for displacing said shutter to simultaneously admit beta rays to both said tubes.

18. In a radiation indicating and detecting instrument having a power source and a meter, means for switching the power source on and off and for concurrently checking the power source voltage comprising, in combination, a ratchet device, a manual operator for said device, a switch directly operated by said operator for connecting the source to the meter, a second switch for connecting said power source to the instrument circuits and means operated by said ratchet device for actuating said second switch, each actuation of said manual operator opening and closing said first switch and alternate actuations of said manual operator opening and closing said second switch.

19. A device as claimed in claim 18, characterized in that said ratchet operating means comprises a cam and a lever operated by said cam and operating said second switch.

20. A device as claimed in claim 18, characterized in that said manual operator comprises a lever, said lever having a pawl mounted thereon and said ratchet device comprises a ratchet wheel operated by said pawl.

21. A device as claimed in claim 18, characterized in that said manual operator comprises a lever and a button cooperating with said lever and further characterized in that an instrument housing is provided, said button being flexibly mounted in an opening in said housing.

22. A device as claimed in claim 18, characterized in that said ratchet device comprises a ratchet wheel and further characterized in that an indicator is mounted for movement with said ratchet wheel to indicate the position of said ratchet wheel and of said second switch.

23. In a radiation indicating instrument having a power source and meter, means for switching the power source on and off and for concurrently checking the power source voltage comprising in combination a ratchet wheel, a lever, a pawl mounted on said lever and cooperating with said ratchet wheel, a cam mounted for rotary movement with said ratchet wheel, a second lever cooperating with said cam, a switch operated by said second lever, a switch operated by said first lever and manual means for operating said first lever to thereby actuate said first and second switches, said first switch remaining closed only while said first lever is actuated and said first-mentioned switch remaining closed between actuations of said first lever.

24. In a radiation detecting instrument, in combination, a pair of integrator tubes each having a beta particle window, said tubes having a common electrical output, means supplying energizing voltage to said tubes, said means comprising a low voltage direct current source, a vibrator, a rectifier, individual voltage regulating tubes, a common output for said integrator tubes, a meter connected for operation in said common output, switching means for connecting said low voltage source to said vibrator and said meter to said rectifier, shutter means for admitting beta particles to said tubes through said windows, a rectangular mounting plate, and means mounting said meter centrally of said plate and said switching means, beta shutter means and integrator tubes on the margins of said plate, one on either side and the other at the rear of said meter.

25. A device as claimed in claim 24, characterized in that said vibrator is mounted on the lower side of said mounting plate.

26. A device as claimed in claim 23, characterized in that a housing is provided for said instrument, said housing being generally L-shaped in vertical cross-section and having a transversely extending wall dividing it into two portions, one portion housing said components and the other portion housing dry batteries comprising the source of direct current voltage.

27. A device as claimed in claim 26, characterized in that said transverse dividing wall carries spring terminal members and said mounting plate has fixed thereto co-operating terminals whereby insertion of batteries in said battery compartment and of the meter and other components on said mounting plate extend the circuits from said low voltage source to the various circuit components mounted on said mounting plate.

28. A housing for radiation detecting instruments and the like, comprising a hollow member having a substantially L-shaped vertical cross-section, a transversely extending wall dividing said member into two portions, one of said portions being adapted to contain the detecting and indicating parts of said instruments and the other of said portions being adapted to contain a source of electrical energy for operating the instrument, and means for carrying said housing.

29. A housing as claimed in claim 28 wherein said last-named means comprises a clip located at a point substantially at the apex of said hollow member, such that the housing may be carried upon the belt of an operator using the instrument.

30. A housing as claimed in claim 28 wherein said last-named means comprises a strap affixed to points located substantially at the apex of said hollow member, such that the housing may be carried by an operator using the instrument.

31. A housing for radiation detecting instruments and the like, comprising a hollow member having a substantially L-shaped vertical cross-section, an indicator viewing aperture located in the outer upper surface of said member, and means for carrying said housing located substantially at the outer apex of said member.

32. A housing for radiation detecting instruments and the like, comprising a hollow member having a substantially L-shaped vertical cross-section, said member being inverted when in normal use, such that the base portion of said L-shaped vertical cross-section forms an upwardly facing surface, an indicator viewing aperture located in said upwardly facing surface, radiation admitting aperture means located in a vertical surface of said member adjacent said upwardly facing surface, and means for carrying said housing located substantially at the outer apex of said hollow member, such that the hollow member may be held in its normal inverted position of use.

33. A housing as claimed in claim 32 wherein said last-named means comprises a clip adapted to engage the belt of an operator using the instrument carried in said housing.

34. A housing as claimed in claim 32 wherein said last-named means comprises a strap adapted to engage a portion of the body of an operator using the instrument carried in said housing.

35. In a radiation detecting instrument, the combination comprising two integrator tubes each having a window formed therein, said tubes having similar characteristic curves expressing tube output current as a function of ionization intensity, each of said curves having upper and lower knee portions and a substantially straight portion between said knee portions, the characteristic curve of one of said tubes having its upper knee portion at substantially the same ionization intensity level as the lower knee portion of the characteristic curve of the other of said tubes; a meter; circuit means interconnecting said tubes and meter, said circuit means providing a common output for said tubes, whereby the resultant characteristic curve for the combined tubes has an extended straight portion between the upper and lower knee portions thereof; and means for calibrating said meter and circuit means comprising a button of radioactive material and means for positioning said button in front of the window of either of said tubes.

References Cited in the file of this patent

UNITED STATES PATENTS

| | | |
|---|---|---|
| 2,518,327 | Jahn | Aug. 8, 1950 |
| 2,546,048 | Test et al. | Mar. 20, 1951 |
| 2,601,583 | Ballou | June 24, 1952 |
| 2,612,743 | Strother | Oct. 7, 1952 |
| 2,666,857 | McLaren et al. | Jan. 19, 1954 |
| 2,694,335 | Albright et al. | Nov. 16, 1954 |
| 2,700,108 | Shamos | Jan. 18, 1955 |